United States Patent [19]
Jiang et al.

[11] Patent Number: 6,122,413
[45] Date of Patent: Sep. 19, 2000

[54] FIBER OPTIC TRANSMITTER

[75] Inventors: Shijun Jiang, Wakefield; Steven P. Bastien, Narragansett; Mala Krishnan, Wakefield, all of R.I.

[73] Assignee: Optigain, Inc., Peace Dale, R.I.

[21] Appl. No.: 09/175,885

[22] Filed: Oct. 20, 1998

[51] Int. Cl.$^7$ .................................................... G02F 1/01
[52] U.S. Cl. .................................. 385/1; 385/4; 385/24; 359/341; 359/180; 372/6
[58] Field of Search .............................. 385/1, 4, 24, 12, 385/37; 359/341, 177, 179, 128, 180, 333; 372/6, 102, 31, 50

[56] References Cited

U.S. PATENT DOCUMENTS

| | | | |
|---|---|---|---|
| 4,740,974 | 4/1988 | Byron | 372/3 |
| 5,039,199 | 8/1991 | Mollenauer et al. | 359/334 |
| 5,136,420 | 8/1992 | Inagaki et al. | 359/341 |
| 5,161,050 | 11/1992 | Grasso et al. | 359/341 |
| 5,287,216 | 2/1994 | Chirravuri et al. | 359/341 |
| 5,363,385 | 11/1994 | Heidemann | 385/31 X |
| 5,375,010 | 12/1994 | Zervas et al. | 359/341 |
| 5,457,562 | 10/1995 | Tremblay | 372/6 X |
| 5,497,265 | 3/1996 | Fontana et al. | 359/341 |
| 5,563,732 | 10/1996 | Erdogan et al. | 359/341 |
| 5,598,491 | 1/1997 | Ohya et al. | 385/24 |
| 5,757,541 | 5/1998 | Fidric | 385/1 X |
| 5,778,014 | 7/1998 | Islam | 372/6 |

*Primary Examiner*—Phan T. H. Palmer
*Attorney, Agent, or Firm*—Barlow, Josephs & Homes, Ltd.

[57] ABSTRACT

A fiber optic transmitter provides integrated creation and amplification of a fiber optic signal from a single pump source. A fiber laser is utilized to produce a signal output and a remnant pump output from a single pump source. The remnant pump output is divided out of the signal path while the signal output is modulated and then recombined with the modulated signal output and passed through an erbium doped fiber which absorbs the pump output to amplify the modulated signal output. The output from the fiber laser is input into a first wavelength division multiplexer (WDM) which divides the pump output from the signal output. The first WDM outputs the signal output on a first output trunk and the pump output on a second output trunk. A modulator is connected to the first output trunk of the first WDM for modulating the signal output. A second WDM having a first input connected to the output of the modulator and a second input connected to the second output trunk (pump output) of the first WDM recombines the signal output and the pump output after modulation of the signal output. The recombined signal and pump outputs are then passed through a rare-earth doped fiber to amplify the modulated signal output.

26 Claims, 6 Drawing Sheets

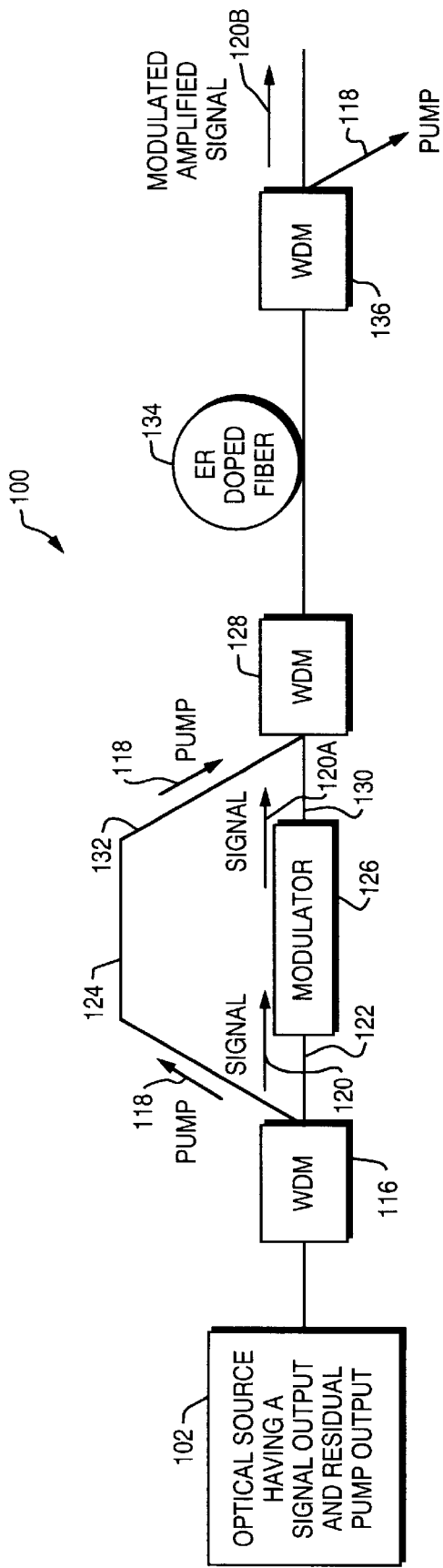
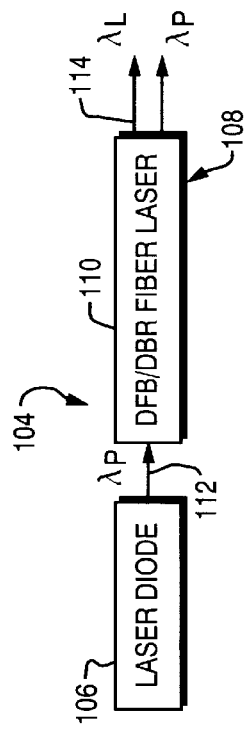
FIG. 2
FIG. 2A

FIBER OPTIC TRANSMITTER

STATEMENT REGARDING FEDERALLY SPONSORED RESEARCH OR DEVELOPMENT

This invention was made with Government support under contract DASG60-96-C-0073 awarded by U.S. Army Space and Missile Defense Command. The government has certain rights in the invention.

BACKGROUND AND SUMMARY OF THE INVENTION

The instant invention relates to fiber optic transmitters, and more particularly, the instant invention relates to an integrated fiber optic transmitter which creates and amplifies a modulated fiber optic signal.

Fiber optic transmitters and amplifiers are well known in the art. In a typical fiber optic communication system, a transmitter and an amplifier are coupled together to produce and amplify a signal to be transmitted over a long distance. Referring to FIG. 1, a semiconductor laser transmitter 10 is utilized to create a transmission signal. The transmitter includes a semiconductor laser 12 having a specified light wave output, i.e. 1550 nm, an optical isolator 14, a modulator 16 to modulate the signal output, and an output connector 18. The output of the transmitter 10 is thereafter input into a fiber optic amplifier 20 to amplify the strength of the light wave for transmission of the signal over a great length of fiber. The amplifier 20 includes an input connector, 22 a separate pump laser 24 having a pump output, i.e. 980 nm, and a wavelength divisional multiplexer (WDM) 26 to combine the signal output with the pump output. The combined signal output and pump output are passed through a rare-earth doped fiber 28 which absorbs the energy from the pump wavelength to amplify the signal output. The amplifier 20 further includes an optical isolator 30 and an output connector 32 for connecting the amplifier into a fiber trunk which will carry the signal.

In this invention, it is an object to provide an integrated approach to a fiber based optic transmitter, which utilizes a single semiconductor laser to pump a rare earth doped fiber laser to generate a single longitudinal mode, single polarization optical laser signal output, and fully use the remnant pump power to amplify the modulated optical laser signal by means of a rare earth dopes fiber, the amplifier being positioned after the modulator. The premise of the invention is to separate the remnant pump output of a fiber laser and utilize this remnant pump to later amplify the modulated signal in a single integrated unit. Also, by placing the amplifier after the modulator (which requires linearized polarized input light) allows the design to use commonly available, inexpensive, non-polarizing components for the amplifier. This design improved overall transmitter performance by eliminating the polarization extinction degradation from a polarization maintaining amplifier. It also significantly reduces the cost of the amplifier since the polarization maintaining components, e.g. isolator, rare earth doped optical fiber, WDM etc., are markedly more expensive compared to other non-polarization maintaining components.

More specifically, a fiber laser produces a signal output and a remnant pump output from a single pump source. The remnant pump output is divided out of the signal path, the signal output is modulated and then recombined with the remnant pump output. The recombined pump and modulated signal output are passed through an erbium doped fiber which absorbs the pump output to amplify the modulated signal output. More specifically, the output from the fiber laser is input into a first wavelength division multiplexer (WDM) which divides the pump output from the signal output. The first WDM outputs the signal output on a first output trunk and the pump output on a second output trunk. A modulator is connected to the first output trunk of the first WDM for modulating the signal output. A second WDM having a first input connected to the output of the modulator and a second input connected to the second output trunk (pump output) of the first WDM recombines the signal output and the pump output after modulation of the signal output. The recombined signal and pump outputs are then passed through the rare-earth doped fiber to amplify the modulated signal output.

The basic creation and amplification arrangement is easily incorporated into a variety of single and multiple wavelength transmitters which no longer require secondary pump sources to create additional signal wavelengths or provide additional pump power. For example, in a multiple wavelength transmitter, a single pump laser combined, either in parallel or series, with a plurality of fiber lasers is operative for creating multiple signal wavelengths in a single system. The signal wavelengths are separated from the remnant pump output, separately modulated, and then recombined with the remnant pump power to amplify all of the signals.

Accordingly, among the objects of the instant invention are: the provision of an improved fiber optic transmitter which reduces the number of physical connectors in a system; the provision of an improved fiber optic transmitter which integrates creation and amplification of an optical signal into a single operating unit; the provision of such a transmitter wherein only a single pump laser is utilized to create and amplify a signal; the provision of such a transmitter wherein a fiber laser is utilized to create a signal output and a remnant pump output; the provision of such a transmitter wherein the remnant pump output is divided from the signal output, and later used to amplify the same signal output after the signal output is modulated; and the provision of a multiple wavelength fiber optic transmitter wherein a single pump laser can be used to create and amplify multiple wavelengths.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 2 is a schematic illustration of a fiber laser based optic transmitter constructed in accordance with the teachings of the present invention;

DESCRIPTION OF THE PREFERRED EMBODIMENT

Figure 1:
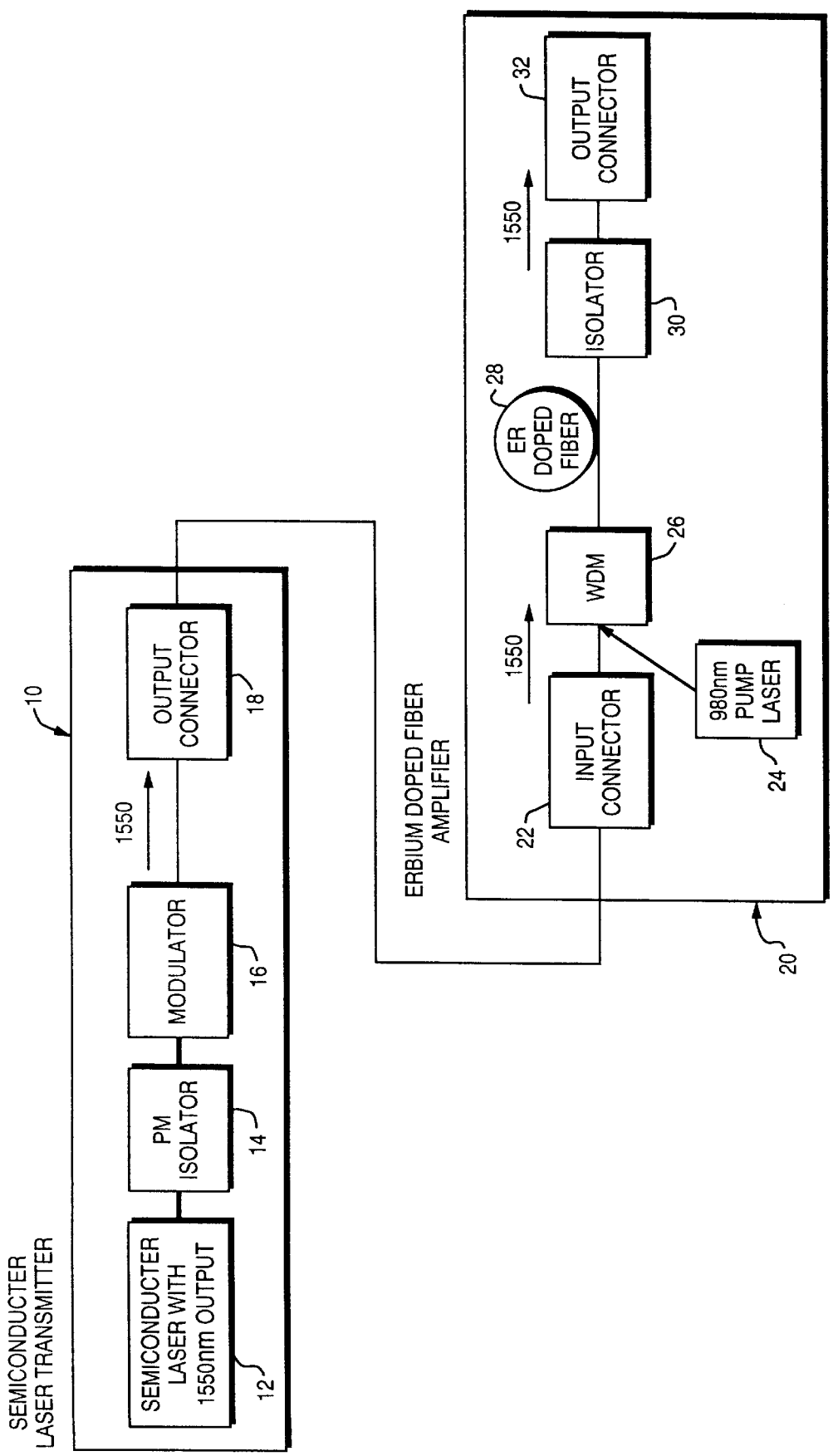
FIG. 1 is a schematic illustration of a semiconductor laser transmitter and erbium doped fiber amplifier as typically arranged in the prior art.

Referring now to the drawings, the fiber optic transmitter of the instant invention is illustrated and generally indicated at 100 in FIG. 2. As will hereinafter be more fully described, the fiber optic transmitter 100 integrates creation and amplification of a fiber optic signal using a single pump source. The premise of the invention is to provide an optical source 102 having a combined signal output and remnant pump output, separate the remnant pump output from the signal, modulate the signal output, recombine the signals and utilize the remnant pump power to amplify the modulated output signal in a single integrated unit.

The optical source 102 which generates light for use in the transmitter 100 comprises a single longitudinal mode, single polarization light source having a combined signal output and a remnant pump output. The term "optical source" is intended to encompass a wide variety of optically pumped light emitting devices, such as fiber lasers, and solid state lasers which are operative for generating the required input. The preferred optical source 102 comprises a fiber laser source generally indicated at 104 (see FIG. 2A), such as a distributed feedback fiber laser (DFB) or a distributed Bragg reflective (DBR) fiber laser. DFB and DBR fiber lasers are fairly well documented in the art. Referring to FIG. 2A, a fiber laser source 104 comprises a pump laser (laser diode) 106 and a rare-earth doped fiber laser generally indicated at 108. The fiber laser 108 comprises a rare-earth doped fiber 110, such as an erbium doped fiber, and a fiber grating related feedback mechanism (not shown). Output $\lambda_P$ (112) of the pump laser 106 passes into the fiber laser 108 which generates $\lambda_L$. The fiber laser 108 thus produces a signal output and a remnant pump output (see arrows 114) from a single pump source. By choosing the core diameter small enough, a fiber laser can be constructed to operate in a single transverse mode just as a conventional single mode fiber. Coupling of the fiber laser to a single mode fiber for transmission is accomplished by splicing.

Referring back to FIG. 2, the output from the optical source 102 is input into a first wavelength division multiplexer (WDM) 116 which divides the pump output 118 from the signal output 120. The first WDM 116 outputs the signal output 120 on a first output trunk 122 and the pump output 118 on a second output trunk 124. A modulator 126 is connected to the first output trunk 122 for modulating the signal output 120. A second WDM 128 having a first input 130 connected to the output of the modulator 126 and a second input 132 connected to the second output trunk 124 (pump output) of the first WDM 116 recombines the modulated signal output 120A and the pump output 118 after modulation. The recombined signal and pump outputs 120A and 118, are then passed through a rare-earth doped fiber 134, such as an erbium doped fiber, to amplify the modulated signal output. The rare-earth doped fiber 134 absorbs the remnant pump output 118 carried in the fiber to amplify the signal output. Optionally, a third WDM 136 can be connected to the output end of the fiber 134 to separate the remaining pump power from the modulated and amplified output signal 120B.

Figure 3:
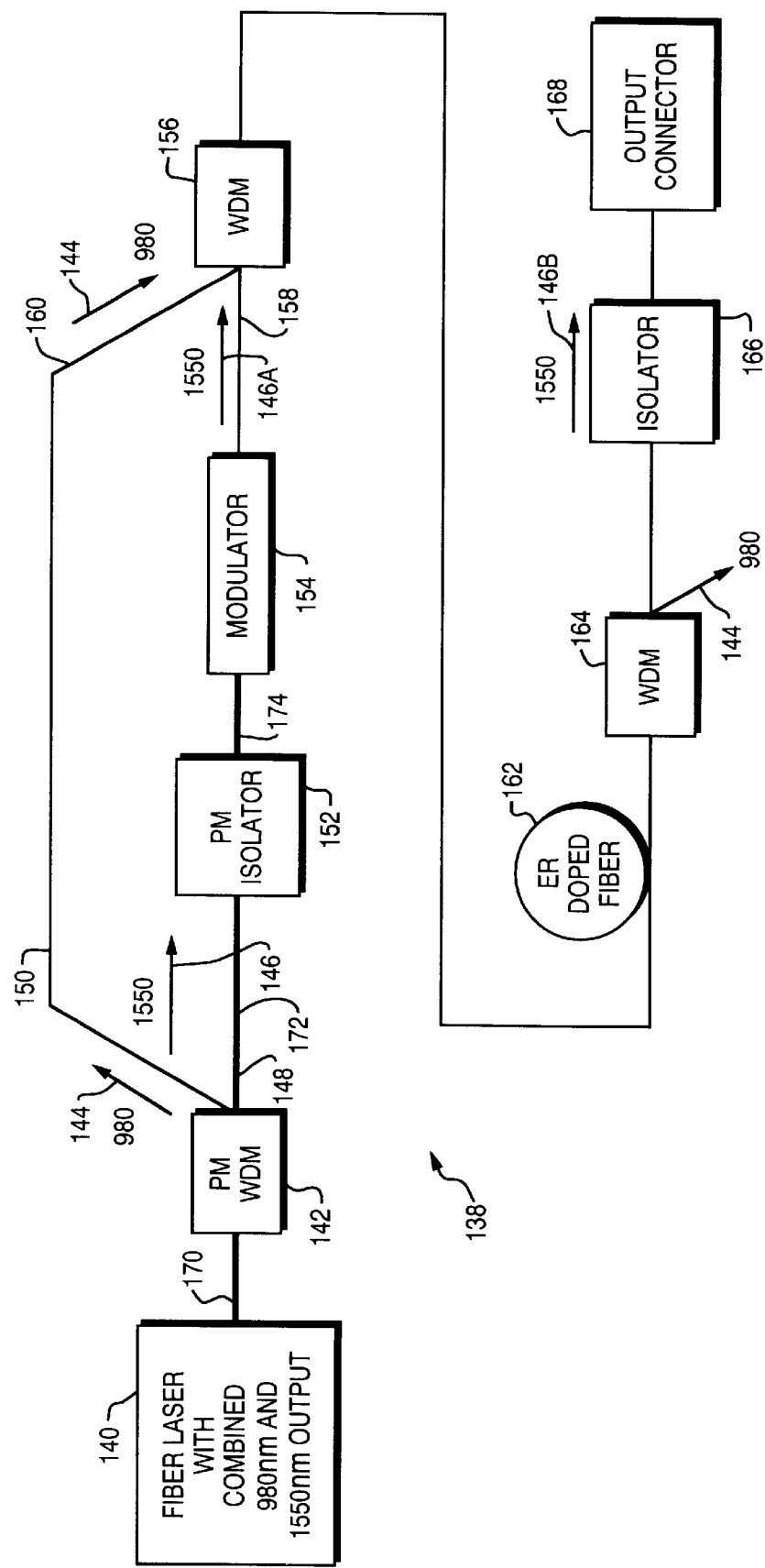
FIG. 3 is a schematic illustration of an alternate embodiment thereof.

Turning the FIG. 3, a preferred embodiment of the fiber optic transmitter is illustrated and generally indicated at 138. The transmitter 138 comprises a distributed feedback fiber laser source 140 having a 980 nm pump laser (not shown), and a rare earth doped fiber (not shown) effective for producing a signal wavelength of 1550 nm. The output from the fiber laser 140 is input into a polarization maintaining wavelength division multiplexer (PM WDM) 142 which divides the 980 nm pump output 144 from the 1550 nm signal output 146. The PM WDM 142 outputs the 1550 nm signal output 146 on a first output trunk 148 and the 980 nm pump output 144 on a second output trunk 150. A polarization maintaining optical isolator (PM isolator) 152 is connected to the first output trunk 148 of the PM WDM 142. A modulator 154 is connected to the output of the PM isolator 152 for modulating the signal output 146. A conventional wavelength divisional multiplexer (WDM) 156 having a first input 158 connected to the output of the modulator 154 and a second input 160 connected to the second output trunk (pump output) 150 of the PM WDM 142, recombines the 1550 nm signal output 146A and the 980 nm pump output 144 after modulation. The recombined signal and pump outputs 144 and 146A are then passed through an erbium doped fiber 162 to amplify the modulated signal output 146A. Output from the erbium doped fiber 162 is then passed through another WDM 164 which divides any remaining 980 nm pump output 144 from the modulated and amplified 1550 nm signal output 146B. The signal output 146B is then passed through another optical isolator 166 and terminated with a matable output connector 168. The resulting output is a modulated and amplified signal 146B which does not require any further amplification before transmission through a conventional fiber optic network.

The use of polarization maintaining (PM) components PM WDM 144 and PM isolator 152 is important in the context of the present application. In this regard, sections 170, 172 and 174 of polarization maintaining fiber are used to connect the fiber laser source 140 to the PM WDM 142, the PM WDM 142 to the PM isolator, and the PM isolator to the modulator. The remaining sections of connecting fiber comprise conventional fibers and components which greatly simplified the structure of the erbium doped fiber amplifier sections.

The basic signal creation and amplification arrangement is easily incorporated into multiple wavelength transmitters which will no longer require multiple secondary pump sources to create additional wavelengths or provide additional pump power.

Figure 4:
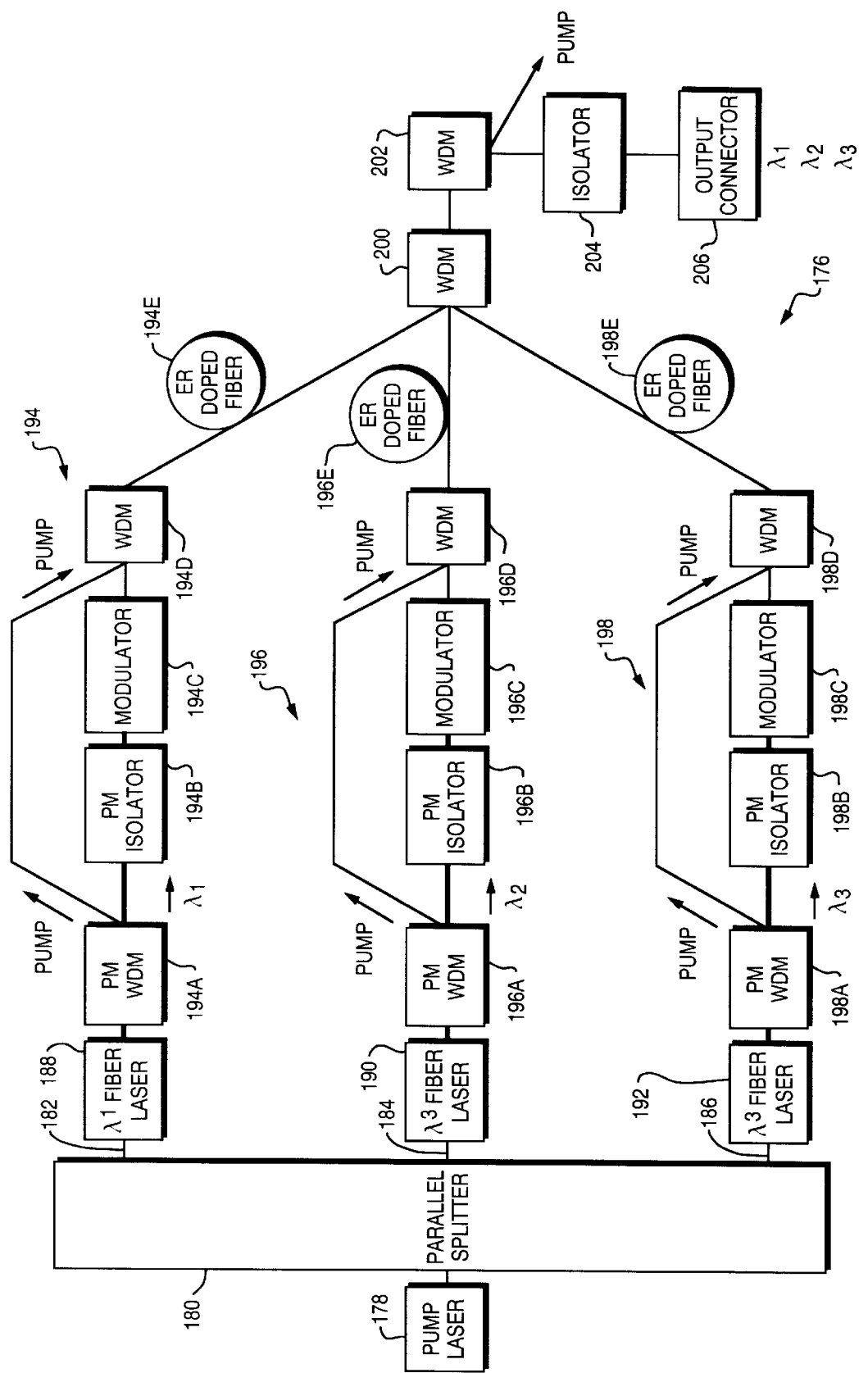
FIG. 4 is a schematic illustration of a parallel channel, multiple wavelength fiber optic transmitter constructed in accordance with the teachings of the present invention.

For example, FIG. 4 is a schematic illustration of a parallel channel, multiple wavelength transmitter generally indicated at 176 including three separate signal channels output from a single pump laser. More specifically, the multiple wavelength transmitter 176 comprises a pump laser 178, a parallel splitter 180 connected to the pump laser 178 for providing first, second and third pump output channels 182, 184 and 186 respectively. Each output channel 182, 184, 186 is provided with a fiber laser 188, 190, 192 constructed and arranged to produce a signal output of a predetermined wavelength $\lambda_1$, $\lambda_2$, $\lambda_3$. Output from each of the fiber lasers 188, 190, 192 is then passed through a respective modulation/amplification sub-assembly generally indicated at 194, 196, and 198, each subs-assembly comprising a PM WDM (A) connected to the fiber laser for separating the pump output from the respective signal output, a PM isolator (B), a modulator (C), a conventional WDM (D) and a rare-earth doped fiber (erbium doped fiber) (E). In all connections where polarization must be maintained, polarization maintaining fibers (illustrated in thick lines) are utilized. Outputs from the three separate channels are recombined into a single channel with a wavelength division multiplexer (WDM) 200. Output from the WDM 200 is passed through another wavelength division multiplexer (WDM) 202 which divides any remaining pump output from the modulated and amplified signal outputs. The signal output is then passed through another optical isolator 204 and terminated with a matable output connector 206. The resulting output is a modulated and amplified multiple wavelength signal which does not require any further amplification before transmission through a conventional fiber optic network.

Figure 5:
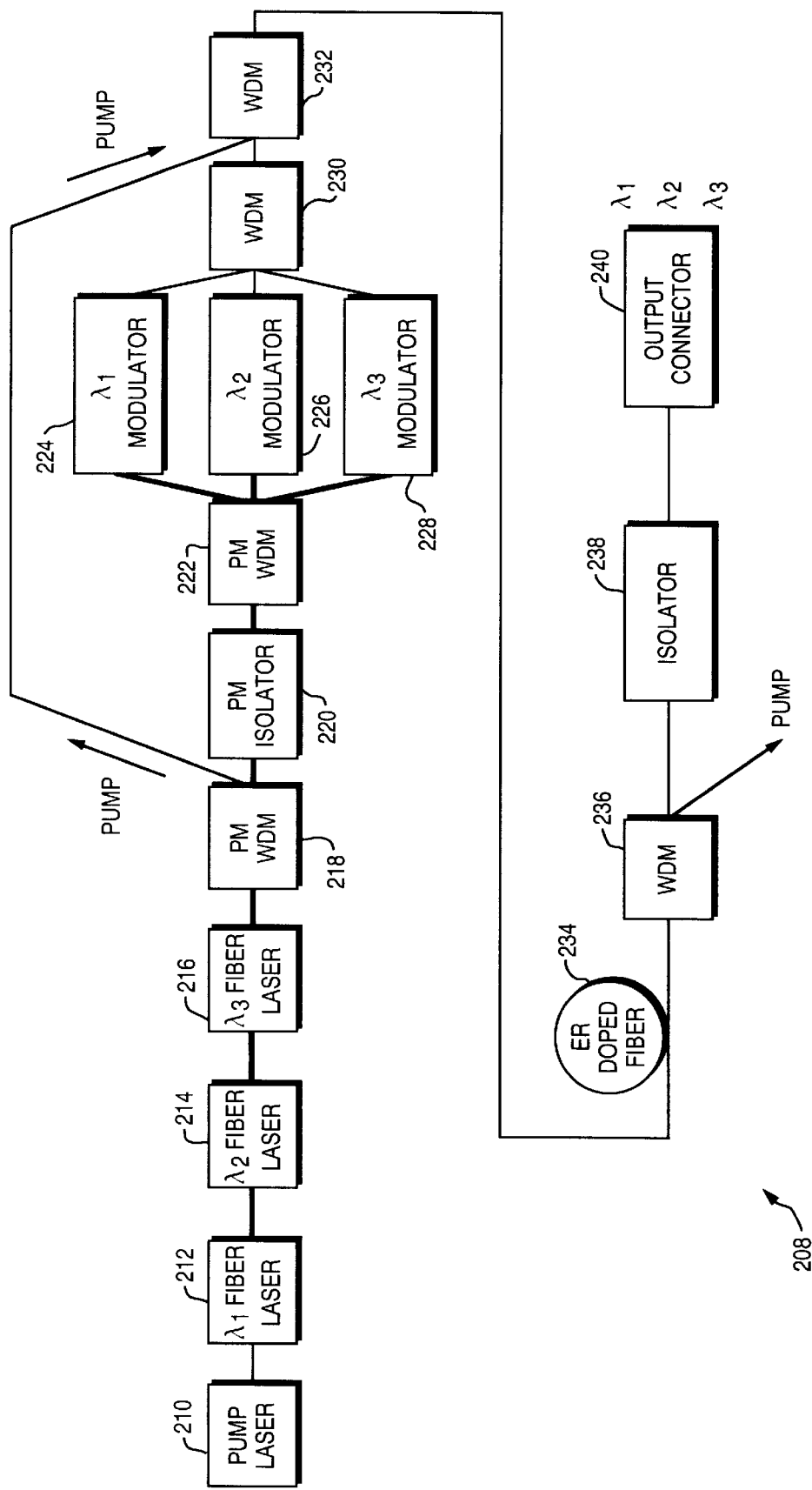
FIG. 5 is a schematic illustration of a series fiber laser, parallel modulator multiple wavelength fiber optic transmitter constructed in accordance with the teachings of the present invention.

As a further example, FIG. 5 is a schematic illustration of a multiple wavelength transmitter generally indicated at 208 wherein the fiber lasers are connected in series rather than in parallel. The multiple-wavelength fiber optic transmitter 208 comprises a pump laser 210, and first, second and third fiber lasers 212, 214, 216 respectively connected in series to an output of the pump laser 210, each laser being constructed and arranged to produce a predetermined signal output $\lambda_1$, $\lambda_2$, $\lambda_3$. A PM WDM 218 separates the pump output from the respective signal outputs. Output from the PM WDM 218 is passed through a PM isolator 220, and through another PM WDM 222 which outputs the respective first, second and third wavelength signals $\lambda_1$, $\lambda_2$, $\lambda_3$ on parallel output trunks. A modulator 224, 226, 228 is connected to each of the output trunks to individually modulate each of the separate signal outputs $\lambda_1$, $\lambda_2$, $\lambda_3$. In all connections where polarization must be maintained, polarization maintaining fibers (illustrated in thick lines) are utilized. A WDM 230 is connected to the outputs of the three modulators 224, 226, 228 to recombine the three signal outputs. Another WDM 232 recombines the first, second and third modulated signal outputs with the pump output. The recombined signal and pump outputs are then passed through an erbium doped fiber 234 to amplify all three of the modulated signal outputs. Output from the erbium doped fiber 234 is then passed through yet another WDM 236 which divides any remaining pump output from the modulated and amplified signal outputs. The signal output is then passed through another optical isolator 238 and terminated with a matable output connector 240.

Figure 6:
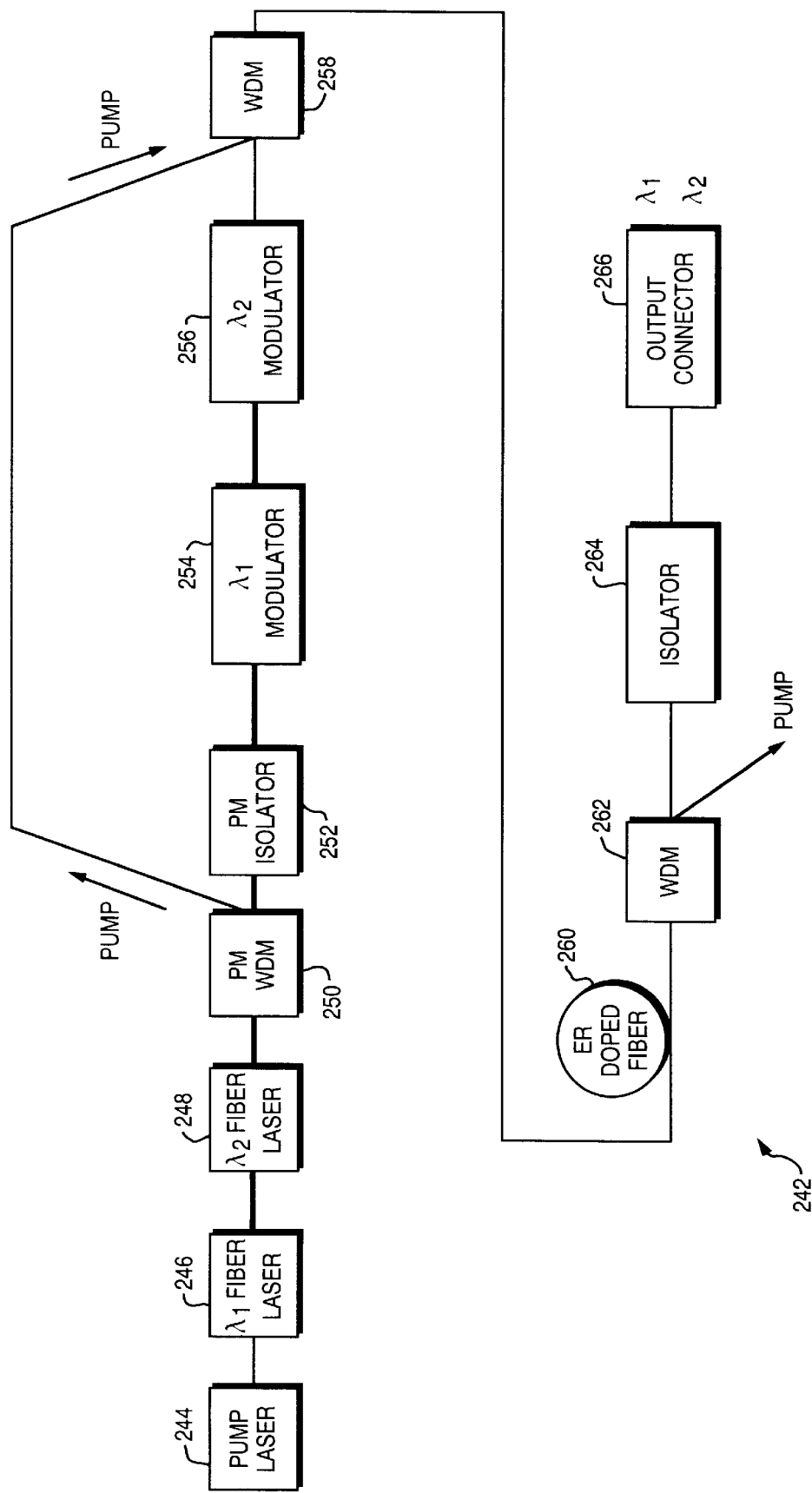
FIG. 6 is a schematic illustration of a series fiber laser, series modulator multiple wavelength fiber optic transmitter constructed in accordance with the teachings of the present invention.

In yet another example, FIG. 6 is a schematic illustration of a multiple wavelength transmitter generally indicated at 242 wherein the fiber lasers are connected in series and the modulators are connected in series. The multiple-wavelength fiber optic transmitter 242 comprises a pump laser 244, and first and second fiber lasers 246, 248 respectively connected in series to an output of the pump laser 244, each laser being constructed and arranged to produce a predetermined signal output $\lambda_1$, $\lambda_2$. A PM WDM 250 separates the pump output from the respective signal outputs. Output from the PM WDM 250 is passed through a PM isolator 252, and through first and second series modulators 254, 256, each modulator constructed and arranged to modulate a respective signal output without interfering with the other existing signals. At the present time, series modulators are not an available item. However, it is anticipated that series modulators will be available sometime in the near future. A WDM 258 recombines the first and second modulated signal outputs with the pump output. The recombined signal and pump outputs are then passed through an erbium doped fiber 260 to amplify the modulated signal outputs. Output from the erbium doped fiber 260 is then passed through yet another WDM 262 which divides any remaining pump output from the modulated and amplified signal outputs. The signal output is then passed through another optical isolator 264 and terminated with a matable output connector 266.

Throughout the specification, the term wavelength division multiplexer (WDM) has been generically used to define a device which can either separate or recombine signals of different wavelengths. It is to be understood there may be other coupling, connector or networking devices, including, but not limited to star couplers, switches, ring networks, repeaters, and directional couplers, which could theoretically function in the same manner as a wavelength division multiplexer to separate and recombine signal wavelengths. In this regard, the Applicant's consider any device which separates and/or recombines signals to be a functional equivalent of a wavelength division multiplexer, and considers these items to be within the scope of the functional definition of a wavelength division multiplexer.

The term "modulator" has also been broadly used within the specification to define a device which creates and/or impresses a signal onto a light wave. It is to be understood that the term "modulator" includes, but is not limited to analog or digital modulators, and may further include electrooptic or fiber modulators, each of which is known in the art.

It can therefore be seen that the present invention provides an improved fiber optic transmitter arrangement which reduces the number of physical connectors in a communication system and which integrates creation and amplification of an optical signal into a single operating unit. The use of a single pump laser to create and amplify single or multiple signal outputs reduces the number of secondary amplifier lasers and significantly reduces cost and power requirements. The use of remnant pump output to amplify the same signal output after the signal output is modulated is an efficient use of system resources. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A fiber optic transmitter comprising:
    a single longitudinal mode, single polarization fiber laser constructed and arranged to simultaneously have a signal output and a pump output;
    a polarization maintaining wavelength division multiplexer (PM WDM) connected to said fiber laser for separating the pump output from the signal output, said PM WDM outputting the signal output on a first output trunk and the pump output on a second output trunk;
    a polarization maintaining optical isolator (PM isolator) connected to the first output trunk of the PM WDM;
    a modulator connected to the PM isolator;
    a first wavelength division multiplexer (WDM) having a first input connected to an output of the modulator, and a second input connected the second output trunk of the PM WDM, said first WDM recombining the signal output and the pump output after modulation of the signal output; and
    a rare-earth doped fiber having an input end connected to an output of the first WDM.

2. The fiber optic transmitter of claim 1 further comprising a second WDM having an input connected to an output of the rare-earth doped fiber for separating the pump output from the signal output, said second WDM outputting an amplified modulated signal on a first output trunk and said pump output on a second output trunk.

3. The fiber optic transmitter of claim 2 further comprising an optical isolator having an input connected to said first output trunk of said second WDM.

4. The fiber optic transmitter of claim 3 further comprising an output connector connected to an output of said optical isolator.

5. The fiber optic transmitter of claim 1 wherein said fiber laser comprises a distributed feedback fiber laser.

6. The fiber optic transmitter of claim 1 wherein said fiber laser comprises a distributed Bragg reflector fiber laser.

7. The fiber optic transmitter of claim 1 wherein said modulator comprises an electrooptic modulator.

8. The fiber optic transmitter of claim 1 wherein said modulator comprises a fiber modulator.

9. A multiple-wavelength fiber optic transmitter comprising:
- a single longitudinal mode, single polarization pump laser;
- a parallel splitter connected to said pump laser for providing first and second pump output channels;
- first and second fiber lasers respectively connected to said first and second output channels, said first fiber laser being constructed and arranged to produce a first signal output, said second fiber laser being constructed and arranged to produce a second signal output;
- a modulation sub-assembly connected to each of said first and second fiber lasers, each of said modulation sub-assemblies comprising
  - a polarization maintaining wavelength division multiplexer (PM WDM) connected to said respective fiber laser output for separating the pump output from the respective signal output, said PM WDM outputting said respective signal output on a first output trunk and a pump output on a second output trunk,
  - a polarization maintaining isolator connected to the first output trunk of the PM WDM;
  - a modulator connected to the PM isolator,
  - a first wavelength division multiplexer (WDM) having a first input connected to the modulator, and a second input connected the second output trunk of the PM WDM, said first WDM recombining the respective signal output and the pump output after modulation of the respective signal output, and
  - a rare-earth doped fiber connected to an output of said first WDM; and
- a second WDM having first and second inputs connected to the respective output ends of the rare-earth doped fibers of said modulation sub-assemblies.

10. The multiple wavelength fiber optic transmitter of claim 9 wherein at least one of said fiber lasers comprises a distributed feedback fiber laser.

11. The multiple wavelength fiber optic transmitter of claim 9 wherein at least one of said fiber lasers comprises a distributed Bragg reflector fiber laser.

12. The multiple wavelength fiber optic transmitter of claim 9 wherein at least one of said modulators comprises an electrooptic modulator.

13. The multiple wavelength fiber optic transmitter of claim 9 wherein at least one of said modulators comprises a fiber modulator.

14. The multiple wavelength fiber optic transmitter of claim 9 further comprising a third WDM having an input connected to an output of the second WDM for separating the remnant pump output from the respective signal outputs, said third WDM outputting amplified modulated first and second output signals on a first output trunk and said pump output on a second output trunk.

15. A multiple-wavelength fiber optic transmitter comprising:
- a single longitudinal mode, single polarization pump laser;
- first and second fiber lasers respectively connected in series to an output of said pump laser, said first fiber laser being constructed and arranged to produce a first signal output, said second fiber laser being constructed and arranged to produce a second signal output;
- a first polarization maintaining wavelength division multiplexer (PM WDM) connected to an output of said second fiber laser for separating the pump output from the respective signal outputs, said first PM WDM outputting said respective signal outputs on a first output trunk and a pump output on a second output trunk;
- a polarization maintaining isolator connected to the first output trunk of the first PM WDM;
- a second PM WDM having an input connected to the PM isolator, said second PM WDM outputting said first signal output on a first output trunk and said second output signal on a second output trunk;
- first and second modulators connected respectively to the first and second output trunks of said second PM WDM;
- a first WDM having a first input connected to the first modulator, and a second input connected the second modulator, said first WDM recombining said first and second signal outputs;
- a second WDM having a first input connected to the output of said first WDM, and a second input connected to the second output trunk of said first PM WDM, said second WDM recombining the first and second modulated signal outputs with the pump output; and
- a rare-earth doped fiber connected to an output of said second WDM.

16. The multiple wavelength fiber optic transmitter of claim 15 wherein at least one of said fiber lasers comprises a distributed feedback fiber laser.

17. The multiple wavelength fiber optic transmitter of claim 15 wherein at least one of said fiber lasers comprises a distributed Bragg reflector fiber laser.

18. The multiple wavelength fiber optic transmitter of claim 15 wherein at least one of said modulators comprises an electrooptic modulator.

19. The multiple wavelength fiber optic transmitter of claim 15 wherein at least one of said modulators comprises a fiber modulator.

20. The multiple wavelength fiber optic transmitter of claim 15 further comprising a third WDM having an input connected to the output end of the rare-earth doped fibers for separating the remnant pump output from the first and second signal outputs, said third WDM outputting amplified modulated first and second output signals on a first output trunk and said pump output on a second output trunk.

21. A multiple-wavelength fiber optic transmitter comprising:
- a single longitudinal mode, single polarization pump laser;
- first and second fiber lasers respectively connected in series to an output of said pump laser, said first fiber laser being constructed and arranged to produce a first signal output, said second fiber laser being constructed and arranged to produce a second signal output;
- a polarization maintaining wavelength division multiplexer (PM WDM) connected to an output of said second fiber laser for separating the pump output from the respective signal outputs, said PM WDM outputting said respective signal outputs on a first output trunk and a pump output on a second output trunk;

a polarization maintaining isolator connected to the first output trunk of the PM WDM;

first and second modulators respectively connected in series to the PM isolator;

a first wavelength division multiplexer (WDM) having a first input connected to an output of the second modulator, and a second input connected the second output trunk of said PM WDM; and a rare-earth doped fiber connected to an output of said first WDM.

22. The multiple wavelength fiber optic transmitter of claim 21 wherein at least one of said fiber lasers comprises a distributed feedback fiber laser.

23. The multiple wavelength fiber optic transmitter of claim 21 wherein at least one of said fiber lasers comprises a distributed Bragg reflector fiber laser.

24. The multiple wavelength fiber optic transmitter of claim 21 wherein at least one of said modulators comprises an electrooptic modulator.

25. The multiple wavelength fiber optic transmitter of claim 21 wherein at least one of said modulators comprises a fiber modulator.

26. The multiple wavelength fiber optic transmitter of claim 21 further comprising a second WDM having an input connected to the output end of the rare-earth doped fibers for separating the remnant pump output from the first and second signal outputs, said second WDM outputting amplified modulated first and second output signals on a first output trunk and said pump output on a second output trunk.

* * * * *